Aug. 15, 1967 R. F. DYER ETAL 3,336,174
METHOD OF MAKING A FIBROUS FILTER PRODUCT
Filed April 6, 1965 2 Sheets-Sheet 1

RICHARD F. DYER
JOHN M. WININGER, JR.
INVENTORS

BY R. Frank Smith
Abram W. Hatcher
ATTORNEYS

Aug. 15, 1967    R. F. DYER ETAL    3,336,174
METHOD OF MAKING A FIBROUS FILTER PRODUCT
Filed April 6, 1965    2 Sheets-Sheet 2

HAIR-LIKE PROTRUSIONS    FRACTURED FILM

BONDS AT INTERSECTIONS OF FRACTURED FILM

HAIR-LIKE PROTRUSIONS

RICHARD F. DYER
JOHN M. WININGER, JR.
INVENTORS
BY R. Franck Smith
Abram W. Hutcher
ATTORNEYS though our invention involves gas-jet
United States Patent Office 3,336,174
Patented Aug. 15, 1967

3,336,174
METHOD OF MAKING A FIBROUS FILTER PRODUCT
Richard F. Dyer and John M. Wininger, Jr., Kingsport, Tenn., assignors to Eastman Kodak Company, Rochester, N.Y., a corporation of New Jersey
Filed Apr. 6, 1965, Ser. No. 446,059
5 Claims. (Cl. 156—167)

This is a continuation-in-part of our copending application Ser. No. 257,386 entitled, "Textile Material and Process and Apparatus Therefor," filed Feb. 11, 1963, now abandoned.

This invention relates to a new textile material and processes and apparatus for the production thereof. More particularly this invention concerns a new material referred to as nonwoven textile material and simplified, relatively inexpensive process and apparatus for the production thereof.

In the industry as well known there are a number of products presently produced from jute, hemp, sisal and cotton and the like material of vegetable origin. These products range from rug backings and bags to simple twine or string used for tying packages. As also known such products because of their vegetable nature are susceptible to attack by bugs, mildew and other destructive forces. Also some of these vegetable material fibers have considerable color. Hence, their use in textile material would in some instances be subject to rather serious limitations. With the advent of various polymeric compositions which are resistant and inert it can be seen that making such type textile products from polymeric compositions would have some advantages.

Hence, work has been expended in spinning various resistant polymeric compositions through spinnerettes to obtain polymeric filaments. Such spinnerettes spun filaments, except for high expense of manufacture, are usually resistant, excellent symmetrical filaments. However, the expense and symmetry works against the use of such filaments for the above referred nonwoven type purposes. That is, polymeric filaments may be prone to be slippery and hence do not strongly adhere even when substantial twist is imparted to the materials such as making the materials into twine or heavy denier yarns and the like. It has been proposed to incorporate roughening agents into such fibers from such polymeric compositions and this may have advantages under some circumstances. On the other hand, such additives further increase the cost of the symmetrical filaments and may cause abrasive action on equipment dispensing such products.

It is therefore apparent that the development of a simplified convenient process and apparatus for the production of textile material which can be used for nonwoven product and related purposes represents a highly desirable result. After extended investigation we have found what is believed to be a materially different procedure for making textile products of the class indicated. This procedure is not only relatively simple, fast and less expensive than spinnerette spinning but permits the production of products not only of a coarseness suitable for nonwoven uses as aforementioned but also of a process, if desired, providing new products and fields of usage.

In further detail, the stiffness and large denier size of polypropylene monofilament cause it to be too stiff for many end uses. A fine material would be much more desirable in many fabrics and in many nonwoven end uses. However, the cost of producing such by conventional means is quite high due to the slow production rates and the expensive equipment such as spinnerettes and spinning machines required. Two types of multifilament yarn are common in the industry. The first of these is composed of continuous filaments. The second is composed of staple fibers. Traditionally, continuous filament yarn is considerably more expensive but is stronger than yarn which has been spun from staple fibers. Staple fiber yarns while somewhat less costly are weaker in strength. It is highly desirable, therefore, that a method of converting polymer into high-strength flexible flat, partially fractured, substantially continuous, polymeric ribbons be devised which would utilize the low cost extrusion equipment of the film extruding industries and still retain the flexibility and hand of continuous filament yarns or staple yarns traditional in the textile trade.

In its broader aspects this invention utilizes a method of converting slit film into textile products by subjecting the film to the fracturing action of gaseous media. By varying the conditions of the fluid treatment of the film, textile products may be made which vary in appearance from a product appearing substantially continuous with few or no broken or loose ends to one with a staple-like appearance containing a large number of broken ends. While it is known in the prior art, to extrude a film, slit it into narrow width, orient it and then beat it with a brush or by similar mechanical treatments, these treatments of the prior art were difficult to control and made it impossible to obtain the wide variety of products possible by the instant invention.

One object of this invention is to disclose means which are economical and versatile for converting polymeric materials into textile products. Another object is to provide a process involving extruding a film, orienting it highly in a longitudinal direction, and subjecting it to the action of a high velocity fluid medium, and thereby forming the film into a flat, partially fractured, substantially continuous web or mass of polymeric ribbons. A further object of this invention is to disclose a process of producing a new product which resembles tow in appearance. Another object is to disclose a process of producing a nonwoven product from film which has substantially the same appearance as a staple product. A further object is to disclose a process of converting a film into a ribbon-like mass which has substantially the appearance of a bulky, staple-like product, said mass being characterized by internal entanglement. A still further object of this invention is to provide a nonwoven polymeric product of high resiliency characteristics. Yet another object of this invention is to disclose a method of producing a nonwoven polymeric product as a tobacco smoke filter. A further object is to provide a high efficiency gas filter composed of flat, partially fractured, substantially continuous polymeric ribbons. A still further object of this invention is to disclose apparatus for economically converting film into any of the foregoing textile yarn products. Other objectives will be apparent from the description of the invention which follows.

In its broader aspects our invention involves gas-jet fracturing of a longitudinally oriented, extruded polymer film into a flat, partially fractured, substantially continuous mass of ribbons and compacting said mass into a substantial cylindrical vapor-permeable nonwoven product such as an air or tobacco smoke filter or into a nonwoven product.

The flat ribbons may contain less than 10% by weight of hair-like protrusions extending at random in substantially all directions. The ribbons comprise a network of coarse strands 10 to 90 microns wide by 10 microns or more thick (0.0004"). The fine protrusions are connected at one end to the strands which make up the body of the network and free at the other. They are 2 to 10 microns thick.

According to one embodiment of our invention the ribbon-like mass is formed into a wrapped rod which is cut into tobacco smoke filter elements. In another embodiment the ribbons of our invention are cut with or without crimping and formed into a nonwoven batt by carding or the like. The ribbons are thus distributed in a random, interlocking manner. The batt or web may be dusted with a thermoplastic, lower-melting polymer which is then fused to form bonds at the intersects of the ribbons. Thus, a polypropylene ribbon batt may be bonded by polyethylene, either powdered or fibrous. Adhesive bonding may also be accomplished by using natural or synthetic latex, nitrile, acrylic polyvinyl acetate emulsions or phenolic resin powders. The battings may also be mechanically bonded by pneumatic entanglement or needle punching.

For assistance in the understanding of this invention reference is made to the attached drawings forming a part of this application. In these drawings.

Figure 4:
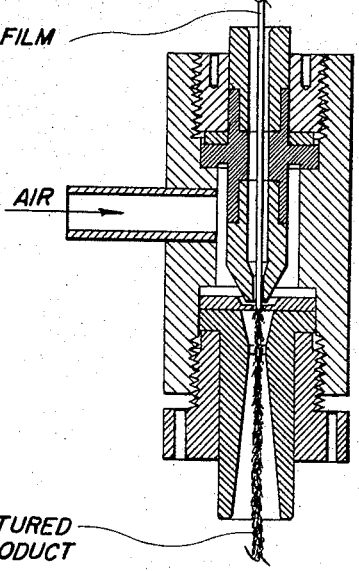

FIG. 4 likewise is a cross-sectional view showing another form of jet which we prefer to employ in many instances for carrying out the herein described process.

Figure 5:
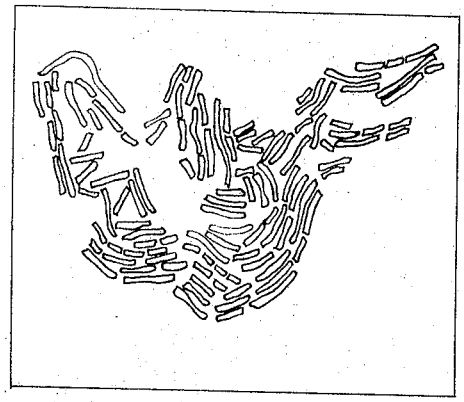

FIG. 5 is a cross-sectional view on a greatly enlarged scale indicating the general nature of that which a photomicrograph of the cross-section of our new product displays as to flat fractured ribbons.

Figure 6:
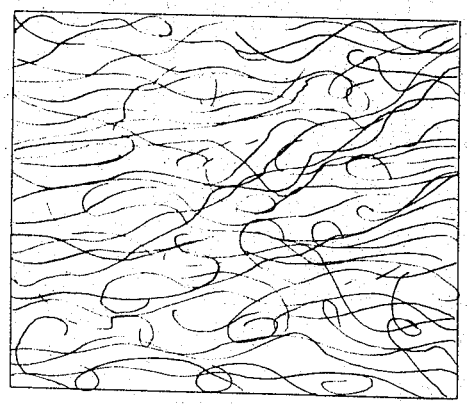

FIG. 6 is a view likewise on a greatly enlarged scale depicting a longitudinal section of the intermediate ribbon-like mass of the present invention as would be observed from certain photomicrograph pictures thereof.

Figure 7:
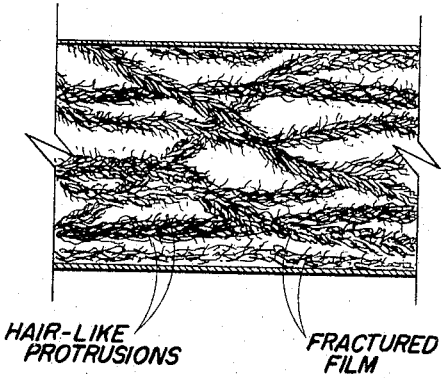

FIG. 7 is a schematic diagram of a wrapped tobacco smoke filter element containing compacted flat fractured film with hair-like protrusions according to our invention.

Figure 8:
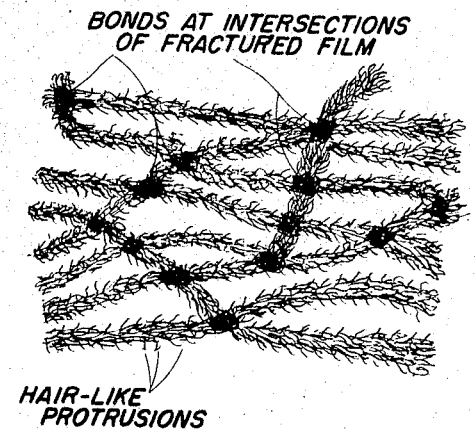

FIG. 8 is a diagram of a nonwoven batt made up of fractured film bonded together at intersects according to another embodiment of our invention.

Figure 1:
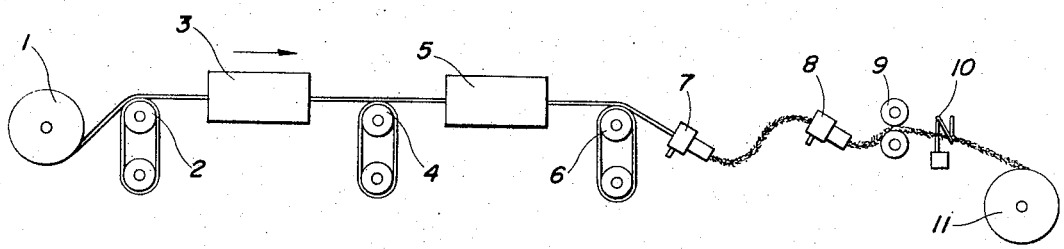
FIG. 1 is a schematic side elevation view of one system for drafting, heat setting and disintegrating the preliminary oriented film product into flat, partially fractured ribbons of the present invention.

The nature and contents of the various parts making up the assemblies illustrated in the drawings are now described more completely as follows:

Referring to FIG. 1, 1 represents the supply package for the film or sheeting to be processed in the present invention. This supply package 1 may comprise a conventional roll or drum of the film or other similarily convenient rotatable supply source.

The supply source is in series with one or more canted rolls designated 2 about which the film may be wrapped one or more times before passing into drafting oven 3. This oven 3 may be of any of the usual constructions employed in the film manufacturing industry. It can be heated electrically or with air or any other convenient and controllable source of heat. Since the temperature of operation of these ovens will be referred to in more detail hereinafter, extended description at this point appears unnecessary.

The film discharging from oven 3 is wrapped around canted rolls 4 for feeding into oven 5. These canted rolls 4 may be the same as rolls 2 or rolls 6 to be referred to shortly. Likewise oven 5 may be of the same general construction as oven 3 but in this particular embodiment of FIG. 1 oven 5 is employed for heat setting as will be explained in more detail hereinafter.

Figure 3:
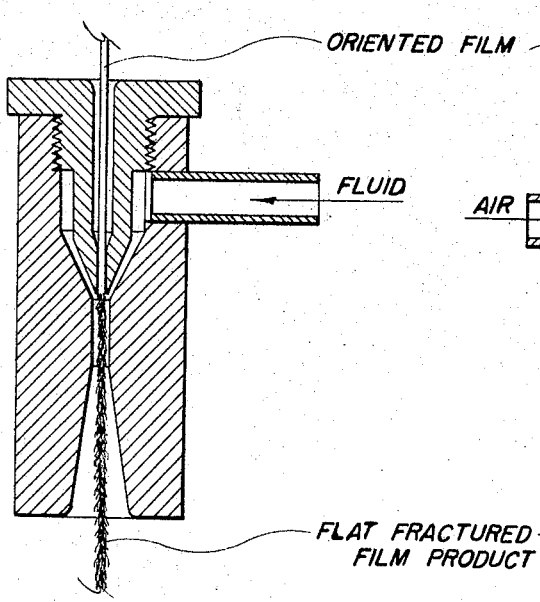
FIG. 3 is a side elevation view in cross section showing one form of jet which we prefer to employ in many instances for carrying out the herein described process.

Oven 5 discharges the drawn film onto and around canted rolls 6 which feed into a rather large jet the construction of which is shown in detail in FIGS. 3 and 4 referred to above. This large jet 7 discharges to a smaller jet 8 the construction of which may likewise be the same as just mentioned, differing primarily only in being of smaller size.

The flat film yarn from the jet 8 is picked up between the nips between the pair of pressure rolls 9, passes through a conventional traverse guide 10 onto roll 11 or other desired packaging device for other utilization.

Figure 2:
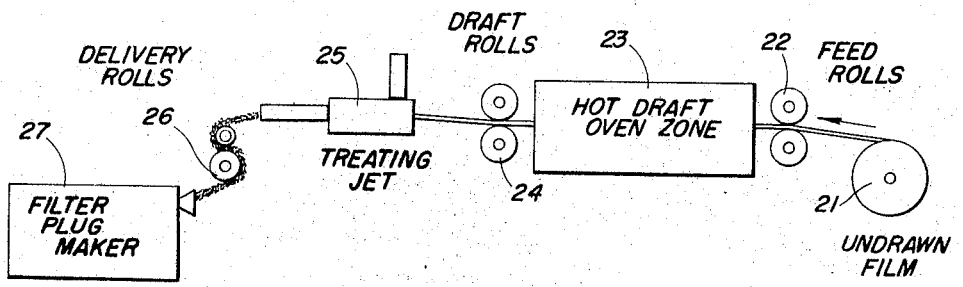
FIG. 2 is a schematic side elevation view of an alternate system for drafting, fracturing drafted film and converting into cigarette filters.

The construction shown in FIG. 2 will now be described. This construction is generally similar to that shown in FIG. 1 and comprises a film supply 21 which may be a roll or drum of film or film extruder or other convenient source of the film to be processed. The film or sheeting withdrawn from 21 is passed through feed rolls 22 into oven 23 which may be the same as the oven referred to in FIG. 1. The heated film from this oven is withdrawn through draft rolls 24. The drafted film is then partially fractured in treating jet 25 and is delivered by rolls 26 to a cigarette filter plug maker 27. From the foregoing it will be observed that the arrangement in this FIG. 2 is generally similar to that of FIG. 1 except that the several jets in series, the heat-set oven and canted rolls have been omitted and a cigarette filter plug maker has been added.

While it is not desired to be bound by any theory of operation of our process, it has been found that the draw oven temperature, length of the heated zone, and the draw ratio or ratio of output rolls 24 speed to input rolls 22 speed should be correlated so that the degree of orientation imparted to the film in the draw zone results in a film strength of at least 3 grams per denier in the longitudinal direction and of less than 0.01 gram/denier in the transverse. The ratio of the longitudinal to the transverse strength is termed the fracturability factor and should be in excess of 300 and preferably is in the range of 1000 or more. Moreover the fracturability angle or the angle between the fracture cracks in the film and the longitudinal axis of the film, after the jet treatment, should be less than 5° and preferably less than 1°. However, if it is desired to make a staple-like yarn, the fracture angle may be in the range of 5 to 10°. It has also been found desirable to establish the draw oven temperature and length in relation to the speed of the film through the oven such that the film after drawing, fracturing, and forming into a yarn will have a low boiling water and hot oven shrinkage. Thus it is desirable to have the total length of the hot draw zone at least 5 times the distance from the point where the film enters the hot draw zone to the point where the draw neck occurs. This ratio may be called the draw/neck length ratio. If its value is relatively high for a given polymeric material the resultant yarn or fibers will tend to have low boiling water shrinkage. If a high draw ratio is used in conjunction with a high draw/neck length ratio the resultant yarns or fibers will have a high modulus. A high modulus or elastic stiffness value is particularly useful when the polymeric yarns or fibers are to be used as replacements for or in conjunction with the natural cellulosic fibers such as sisal, hemp, and cotton.

The draw ratio that can be imparted to a film is related to the thickness of the film and its polymeric composition. Thus a 1 mil thick polypropylene film may be drawn about 6 times its extruded length, whereas a 5 mil thick extruded polypropylene film may be drawn to 12 or more times its extruded length.

For any given combination of extruded film thickness, draw ratio, and fracturability factor the facturing action of the air jet may be controlled to achieve a given percentage of the potential amount of fracturing possible. The potential fracturability may be determined by calculating the number of filaments which could be produced in a drawn film that would have a width equal to three times their thickness. Thus a 1 mil thick drawn film three inches wide could be fractured into 1000 filaments of a 1 mil thick by 3 mil wide rectangular cross section of greater than 1 inch length.

In general it is not desired to achieve 100% fracturing of the film. For example it has been found that if less than 90% of the potential fracturing is present in the final yarn, a further fracturing can take place when the yarn is tied into a knot. This results in the yarn in the knot having more filament-like ribbons than the yarn immediately outside the knot area. When a load is applied to the knot the stiffer filaments outside the knot resist rolling of the knot along the yarn while the finer filaments inside the knot compact together more readily than the stiffer filaments outside the knot. Thus the knot becomes tighter and does not roll out or slip as do knots in smooth continuous synthetic multifilament yarns where the effective yarn size and number of the filaments in the knot structure is the same as the effective yarn size and number of filaments outside the knot. Thus the yarn formed by the process of this invention is particularly useful for tying twines and braided or woven shoe strings and the like where knot slippage is undesirable.

In the type of jet used such as shown in detail in FIGS. 3 and 4 the oriented film is acted upon by a high velocity fluid. This action, as will be explained in greater detail hereinafter and as will be more apparent by the several examples which follow, causes the oriented film ribbon to fracture laterally but not longitudinally into a plurality of flat fractured ribbons.

The fractured ribbons emerging from the jet may be taken up on a conventional twister to impart the desired degree of twist.

Extended further description of FIGS. 3 to 8 is unnecessary since some of these figures have been made from photomicrographs or other photographs of yarn products of the present invention and others are appropriately marked with descriptive terminology thereon.

In its broader aspects the process of this invention may be divided into a number of suboperations as follows: film extrusion, slitting, orienting the film, forming the flat fractured ribbon in a fluid jet, and processing the flat fractured ribbons into non woven products or filters. These separate steps in the operation may be carried out in one continuous process or in various combinations of subprocessing steps. For example, the film may be extruded and slit in one operation. In the second operation, it may be oriented. The third operation would then consist of fractured ribbon forming and processing to batts or filters. A second approach would be to extrude and wind the film full width. The full width roll of film would then be used as a supply for the orienting operation, in which case it would be slit into the desired widths and a plurality of narrow widths of film would be fed through the drafting process. These drafted ends of film might then be wound up on individual packages. These packages would then be transferred to a third operation wherein the individual ends of film would be passed through fluid jets and combined into a further product. In other cases, the extrusion drafting and fractured film formation and filter formation may be carried out in one continuous operation. Depending on the type of end product filter desired, various types of jets may be used so as to induce a range of effects in the finished product. As indicated above, the fractured ribbons of our invention contain fine protrusions. The protrusions constitute less than ten percent of the total filter structure by weight. The removal potential of the filters is as high as filters composed entirely of the fine denier filaments of the prior art as disclosed in U.S. Patents 3,099,594 and 3,079,663 of co-inventor Dyer and others. When nonwoven batts are produced from these ribbons according to our invention, the battings are resilient.

While a substantial understanding of our invention is already apparent from the foregoing general description of the overall apparatus process and product, a still further understanding will be had from a consideration of the following examples which we set forth to illustrate a number of our preferred embodiments of our operation.

*Example I*

With reference to FIG. 1, a 37" wide roll of 5-mil thick polypropylene film was extruded and slit into 1" widths and wound on spools. A spool of this slit film 1 served as the supply for the operation of FIG. 1. The film was withdrawn from the supply spool by canted roll pair 2 and fed into a hot air drafting oven 3 at a speed of 33⅓ feet per minute. The temperature of the draft oven was 340° F. The film was withdrawn from the draft oven 3 by roll pair 4 at a speed of 400 feet per minute for a draft ratio of approximately 12:1. The drafted film was then fed to heat set oven 5 in which the air temperature was 300° F. It was withdrawn from heat set oven 5 by roll pair 6 at a speed of 400 feet per minute. The heat set film was then fed to a jet 7 of the type shown in FIG. 4 of this case. This jet is the jet discussed in detail in Head Patent No. 2,884,756.

The jet was supplied with air at 60 pounds per square inch gauge pressure. The air was at approximately room temperature. The action of the high-velocity, high-pressure air on the film caused it to split into flat, partially fractured, substantially continuous ribbons which were removed from the jet by pinch rolls 9 at a speed slightly less than 400 feet per minute. The flat fractured ribbons were then wound up on a spool by means of tranverse guide 10 and winder 11. Seven yarn ends of these flat fractured ribbons were then twisted together at one turn per inch into a twine of approximately 14,000 denier. This twine was set on the twisted bobbin for seven minutes at 100° C. to reduce its kinkiness. The strength of this twine was 124 pounds break and 87 pounds twine knot break. In a second test, ten ends of the flat fractured ribbons were combined with one turn of twist and a breaking strength of the twine of 177 pounds was obtained and such knots would not slip or pull out of the the tied strand with the beneficial result of this relatively high strength. The baler twine knot break strength was 121 pounds. These twines were evaluated as a substitute for Sisal baler twine on an International Harvester hay baler. The evaluation indicated that the textile cordage of the present example would perform acceptably on this type of agricultural equipment.

When it is desired to produce battings or tows suitable for high removal filtration purposes it may be desirable to subject the film to further beating action in the fracturing jet than is required to achieve 20% or so of the potential fracturability. This additional beating action induces the formation of short hair-like protuberances from the basic two dimensional fractured film ribbons. These hair-like protuberances are formed both on the tops and sides of the coarser 10 micron by 30 micron filaments and are in the order of 1 to 5 microns in width and thickness and may be of square or rectangular cross-section.

Examples II–V illustrate preparation of tobacco smoke filter elements according to our invention.

*Example II*

A one-mil-thick by 1"-wide film was extruded from polypropylene pellets and drawn in a hot oven. The film was drawn with a ratio of 6.2 to 1 in steam at 140° C. The film input speed was 20 feet/minute and the output speed was 124 feet/minute. The film as it left the output draw roll was treated with 35 p.s.i. air in a jet of the type described in U.S. Patent 2,924,868 and was wound up on a bobbin with 2 t.p.i. twist. One hundred twenty-five (125) ends of this yarn, which had a denier of 830, were combined by hand and wrapped in cigarette papers to make a cigarette filter. The filter was tested for tar removal efficiency acording to the procedure given in Tobacco Science 4, 55–61, 1960 with the following results:

| | | |
|---|---|---|
| Length of filter tip | mm | 17 |
| Circumference | mm | 25 |
| Weight of tip less paper | grams | 0.18 |
| Pressure drop | inches water | 3.4 |
| Tar removal | percent | 50 |

By way of comparison, a cellulose acetate, 15-mm. long filter rod weighing 0.13 gram, made from a 1.6 d./f. tow of 37,00 total denier, had a pressure drop of 3.07 and a tar removal of 43.8%. In another comparison, a cellulose acetate filter rod 15-mm. long and weighing 0.165 gram was made from a 2.0 denier per filament (d./f.) tow of 72,000 total denier and had a pressure drop of 2.4 and a tar removal efficiency of 34%. In a further comparison, a 5 denier per filament (d./f.) 80,000 denier cellulose acetate filter tip 15-mm. long weighing 0.17 gram and having a hardness of 5.5 had a pressure drop of 1.2 inches of water and a tar removal efficiency of 17%.

The appearance of the film filter material was substantially as shown in FIG. 7. The size of the large fractured ribbons average 6 denier/ribbon, and they were 12 to 90 microns wide by 10 microns thick. As can be seen from FIG. 7 there were present, in an amount less than 10% by weight, a number of fine hair-like protrusions that were less than about 2 microns wide and thick.

Based on the comparison of the 5 denier per filament (d./f.) acetate filter with the fractured film filter, it can be seen that the film filter with ribbons having these fine hair-like protrusions not present on the prior art acetate filter was significantly more efficient in tar removal.

*Example III*

A sample of drawn and jet-treated film was prepared as in Example II except that the film was drafted 6.4/1 with an input speed of 47 feet/min. and an output speed of 300 feet./min. The film was jet treated at 50 p.s.i. air pressure and wound up as zero-twist yarn. Ninety-five (95) ends of this yarn were beamed onto spools and used as the supply for a cigarette filter plug making machine of the type substantially as described in my co-worker Fritz Ser. No. 259,852, now U.S. Patent 3,255,506.

Several hundred 90-mm. long x 24.9-mm. circumference cigarette filters were made. These filters were cut into 17-mm. lengths and tested for tar removal. The 17-mm. tips weighed 0.177 gram, each had a pressure drop of 2.8" water, and had a tar removal of 36%. No binder was applied to these rods. If desired a polyethylene powdered binder may be used.

Fractured-film filters similarly prepared from a 50/50 mixture of polypropylene and polystyrene were substantially firmer. With this type of fractured film filter rods may be plasticized with such materials as dimethyl azelate, diethyl adipate, diethyl phthalate or the like.

There is also some increase in hardness brought about by combining the jet-treated film with a small amount of tow of cellulose acetate plasticized, for example, with triacetin or the like.

*Example IV*

Thirty-four (34) ends of 1000-denier, jet-treated polymeric film prior to pretensioning were combined with a 33,000-denier cellulose acetate tow made up of 5 denier per filament (d./f.) substantially oval filaments. Triacetin plasticizer (7.1% by weight based on the total rod weight) was applied. Rods 102-mm. long x 24.8-mm. circumference were made which weighed 1.02 grams. These rods had a hardness of 6.4 and a pressure drop of 9.4" of water. When cut into 17-mm. tips and tested for tar removal, these tips weighed 0.17 gram, had a 2.07" water pressure drop, and 25% tar removal. As can be seen in comparison with the data given previously for a 5 denier per filament (d./f.) 100% acetate filter tip, the tar removal for the rod of Example IV was considerably higher.

The fractured film used to prepare filters as in preceding Examples II–IV was prepared substantially as shown in FIG. 1 described hereinabove. According to this procedure the drawn film was prepared by extruding, e.g., a 1-mil polypropylene film about 90 inches wide, and drafting it to a 6.4/1 ratio before winding it up on a mandrel. Or, if desired, a 5-mil thick x 35-inch wide film may be similarly extruded and drawn at a 12 or 13 to 1 ratio. In either case, the roll of drawn film is mounted so as to unroll freely as the film is pulled by feed rolls. From the feed rolls the film is fed to treating jet of the type disclosed in U.S. Patents 2,924,868; 3,081,951 or 3,099,594 of co-inventor Dyer and others. In the jet the film is coarsely shredded or fractured into strips about 5 to 20 denier per filament (d./f.) in size, and tiny hair-like short extensions of less than 5-microns size, are torn loose at one end from the coarse filaments, remaining attached at the other end as shown in FIGS. 6 and 7. The treated film then passes over delivery rolls into the garniture of a cigarette filter plug making machine.

If the film is made from a blend of polypropylene and polystyrene, a plasticizer may be added by any of several means shown in the afore-mentioned patents, to give greater hardness to the rods, if this is desired. In other cases, the rod may be wrapped in a stiff, heavy paper to give the desired rigidity.

If desired, the feed rolls of FIGS. 1 and 2 may be replaced with a driven unrolling stand for the film supply roll.

When starting with undrawn film a draft oven zone is used between the supply of undrawn film and the feed rolls, which in such case act also as output draw rolls. A set of input draw rolls may be placed at the entrance to the hot draft zone to pull the film from the supply roll at the desired rate.

According to the procedure of our invention further described above in Examples II–IV the film used may be prepared by extruding from a hopper source of pellets of a polypropylene, polyethylene, polystyrene, polyallomer, polyester, polyamide copolymer or mixture of these materials, or the like as desired.

The extruded film passes a draw zone, which may consist of draw input and output rolls and a heated draft oven. The drafted film is then fed to the treatment jet, next to the delivery rolls and finally in the garniture of a filter maker.

When it is desired to jet treat the film in an operation which is separate from the plug making, the drawn jet-treated film may be puddled into a baler, with or without crimp, as desired, and then compressed and wrapped. The baled material may next be conveyed into filter plugs by merely pulling it from the bale with feed rolls, fluffing it in an air jet, and passing it to the delivery rolls and garniture of the filter plug maker as shown in Dyer et al. U.S. 3,081,951.

Sometimes, it may be desired to place addenda on the jet-treated film. For example, activated charcoal may be added to provide high removals of the gaseous phase components of cigarette smoke, such as acrolein, isoprene, and others. In such instance the jet-treated film may be fed to a slurry applicator where a mixture of water, binder and activated charcoal is applied to the treated film. The hairy fractured film containing additive then passes through a drying oven where the water is evaporated and the binder activated and cured. The binder holds the activated charcoal on the treated film so that it may be then fed by the delivery rolls into the garniture of the filter plug maker minimum loss of addendum.

Example V

A bale of 50,000 denier, jet-treated stuffer box crimped black film, having an average denier ribbon of 30 was used as supply source. The treated film was coated with a slurry of activated charcoal of 325 mesh or finer, binder (methyl cellulose) and water. The binder was cured and the water evaporated in an oven, and the coated treated film was fed to the cigarette plug maker in which filter rods were prepared.

Exampl VI

A 35,000 denier jet fractured crimped ribbon film having 15 crimps per inch was produced by continuously extruding polypropylene into a film longitudinally orienting said film with a draw/neck length ratio of 5:1, a fracturability factor of over 3000 and a fracturability angle of less than 1°, and in the same continuous process jet fracturing the oriented film to the extent of about 10 to 20% of its potential fracturability and then crimping to 15 crimps per inch in a stuffer box type crimper and packaging in a bale. The bale of crimped fractured film material was then fed to a tobacco smoke filter forming machine wherein about 10% by weight of a low melting point polyethylene binder powder of about 50 mesh was dusted onto the spread-out fractured film. Heat was applied to activate the binder powder and the film and binder were shaped into a tobacco smoke filter rod having a pressure drop of about 5″ of water for a 90-mm. length rod of 24.8 mm. circumference and a tar removal efficiency of about 10%. The filter rods had acceptable firmness or hardness due to the bonding action of the polyethylene binder powder.

For certain twine applications as discussed in our parent application it is desired to effect only a small percentage of the potential fracturability. In the case of forming cigarette filters from our material, however, it is desirable to obtain 50% to 90% or more of the potential fracturability by the jet action. The exact percentage will however depend upon the degree of tar removal efficiency desired. Thus if a high tar removal filter, say 40 to 50% is desired, 80 to 95% of the potential fracturability should be carried out in the jet treatment step of the process. However, if low tar removal is desired, say 20%, then only about 50% or less of the potential fracturability is carried out in the jet treatment stage of the process. Actually if desired tar removal of as low as 10% may be attained by effecting only 5 to 20% of the potential fracturability of the film in the jet treating process. Since the percent of potential fracturability attained is largely a function of jet fluid pressure it will be readily apparent that the present process of FIG. 2 represents a tremendous advance over the prior art spinnerette produced filamentary smoke filters. In our process it is usually only necessary to raise or lower the jet pressure to raise or lower the tar removal properties of the filter. In the prior art if a given spinnerette spun tow could not produce the desired tar removal, it was necessary to discard that tow and manufacture new spinnerettes to produce a finer or coarser denier per filament filamentary tow at great expense and loss of production time.

Examples VII–XI illustrate preparation of nonwoven batts according to our invention.

Example VII

A 5 mil thick film was extruded from a polypropylene composition containing black pigment for ultraviolet degradation resistance and antioxidant for heat resistance. A sheet of this film approximately 11 inches wide was fed between a pair of nip rolls at 37.5 feet per minute to a heated draw zone from which the film was withdrawn at a rate of 450 feet per minute by a second pair of nip rolls to give a net draw ratio of 12 to 1. The drawn film was approximately 5 inches wide and 1 mil thick after drawing. The drawn film was then fed to a jet as described in Dyer U.S. Patent No. 3,099,594.

The jet was fed with air at 30 pounds per square inch gauge and adjusted so that the 5 inch wide film was shattered to such an extent that 80 to 100 slits were formed across the film at all points along its length. The discontinuous ribbons defined by the slits were of a rectangular cross-section and of a cross-sectional area having a mean of about .00005 square inch.

The draw/neck length ratio was 12 to 1. The resultant ribbon product had less than 1% boiling water shrinkage and about 18% shrinkage in hot air at a temperature of 140° C. It has an elastic stiffness of greater than 70. The longitudinal strength before jet fracturing was 6.5 grams per denier, and the transverse strength before fracturing was .00143 gram per denier for a fracturability factor of 4550. The fracturability angle was less than 1°. The fracturing action of the jet was adjusted so that about 6% of the potential fracturability was carried out. Thus there was a residual fracturability of about 94% left in the film prior to carding.

The film was subsequently crimped 8 c.p.i. and cut into 3½ inch lengths. These were then processed on a card to form a web of 10 oz. per square yard. The carding action induced further filtration to the extent that nearly 100% of the potential fracturability of the film was achieved in the majority of the material. Moreover numerous hair-like protrusions were formed to the extent of somewhat less than 10% of the total weight of the material. This web was then dusted with polyethylene, which was subsequently fused to give a bonded fabric. The bonded fabric was ½ inch thick. When compressed with a weight of 5 lbs. per square inch for 24 hours, it regained 90% of this thickness after a 5-minute recovery period.

Example VIII

Fractured polypropylene produced substantially as described in Example VII was crimped 8 c.p.i. cut to 3½ inch lengths and carded to form a web of 25 oz. per sq. yard. This web was then treated with a latex bonding solution and dried, after which treatment it measured ⅝-inch thick. After compressing with a weight of 5 lbs. per sq. inch for 24 hours, the fabric recovered 95% of this thickness within a 5-minute period after removal of the weight.

Example IX

A fractured polypropylene sample such as that used in Example VII and VIII was crimped 20 c.p.i. and cut into 3¼ inch lengths. This material was processed on a card to form a 40 oz. per sq. yard web. The resulting web was then needle-punched to give a coherent, bonded fabric. When compressed with a weight of 10 lbs. per sq. inch for 24 hours, the fabric recovered 85% of its thickness within 5 minutes after removal of the weight.

Example X

Spun polypropylene round cross section filament of a denier of 3 were crimped 10 crimps per inch (c.p.i.) and cut into 3½ inch lengths. These cut fibers were then processed on a card to give a web of 40 oz. per sq. yard, and then bonded with powdered polyethylene. When compressed with a weight of 5 lbs. per sq. inch for a period of 24 hours, this fabric regained only 36% of its original thickness within 5 minutes after removal of the weight.

From Examples VI–IX it may be seen that a nonwoven web prepared from the flat fractured film of our invention has resiliency that far surpasses similar products made from spun polypropylene fibers.

Example XI

A series of flat filament yarns was made using the jet of FIG. 4 with various air pressures ranging from 10 to 40 p.s.i. gauge. The 1″ x 1-mil film was passed through the jet at speeds varying from 20 to 300 feet per minute. A standard twist was inserted of 4.23 t.p.i. Z. The film was polypropylene which had been drafted in 140° C. steam at a draft ratio of 6.2 to 1. The general apparatus arrangement used was substantially as shown in FIG. 1.

The results of these tests made on this material are shown in Table 1 below. It will be noted that in general the fractural ribbon count decreased as the yarn speed increased. The ribbon count increased as the air pressure was increased. Thus the average denier per fractured ribbon in the finished yarn can be varied by suitable adjustment of the jet pressure and the yarn speed through the jet. Examination of the results for strength indicate that in general the lower the jet pressure and the faster the yarn speed the stronger the flat fractured ribbon twisted product will be. With regard to elongation, low jet pressures will generally produce a higher elongation. In fracturing the film with room-temperature air, it will be seen that there was very little effect on the boiling water shrinkage of the textile product. If it is desired to hold the shrinkage to a minimum, it is possible to use steam as the fluid medium which would preshrink the yarn as it was being fractured, thus avoiding shrinkage in the final product.

attached to the coarse ribbons greatly assist in obtaining higher removal rates in tobacco smoke filters.

The filter rods were prepared by plying together 96 ends. of the fractured ribbon product and pulling through filter rod-making equipment.

Estimated denier _____den./fil__ 6
Estimated total denier _____ 105,000
Length of filter tip _____mm__ 17
Circumference of filter tip _____mm__ 25
Weight of filter tip without paper (av. of 20) _____g__ 0.18
Amount tars removed by filter tip ____percent__ 50
Pressure drop of filter tip (av. of 20 tips) inches__ 3.4

The amount of tar removed at this pressure drop is useful. It approaches the efficiency of a 1.6 d./f. crimped acetate tow which can remove up to 50% tar at a pressure drop of 3 inches. A heavy paper wrap obtains the desired rod stiffness.

While in the foregoing examples the jets used have usually been of a circular cross section, a wider variety of jets can be used. For example, the slot venturi-type

TABLE 1.—EFFECT OF YARN SPEED AND PRESSURE UPON PROPERTIES OF FRACTURED RIBBON

Film Type: 4240 polypropylene.
Draft Ratio: 6.2 to 1.0.
Draft Medium: Steam.
Draft Temperature: 140° C.
Twist: 4.23 t.p.i.

| | | | | | | | | | |
|---|---|---|---|---|---|---|---|---|---|
| Pressure (p.s.i.g.) | 10 | 10 | 10 | 20 | 20 | 20 | 40 | 40 | 40 |
| Speed (f.p.m.) | 20 | 90 | 300 | 20 | 90 | 300 | 20 | 90 | 300 |
| Fractured Ribbon Count | 110 | 84 | 46 | 91 | 80 | 79 | 115 | 175 | 100 |
| Denier | 946 | 912 | 966 | 899 | 880 | 859 | 934 | 922 | 894 |
| Tenacity (g./d.) | 4.97 | 5.31 | 4.90 | 4.73 | 4.18 | 4.64 | 3.88 | 4.41 | 4.94 |
| Elongation (percent) | 20.7 | 19.6 | 17.8 | 17.7 | 14.9 | 16.4 | 16.2 | 15.4 | 15.9 |
| Boiling Water Shrinkage (percent) | 4.0 | 4.0 | 4.0 | 3.4 | 3.2 | 3.4 | 3.8 | 3.6 | 4.2 |

While the foregoing examples have related principally to polypropylene film and blends thereof which contained only an antioxidant as an additive, it will be recognized that ultraviolet inhibitors, gas-fading inhibitors, and other materials may be added to the polymer prior to extrusion to give the desired final properties. For example, pigment may be added to the film in suitable amounts and colors to produce a "solution dyed" flat fractured ribbon product if desired.

*Example XII*

As indicated above, the fracture process of the present invention has a wide range of application in the cigarette filter areas. For example, 1-mil thick by 1" wide film may be disintegrated at 40 p.s.i. air pressure and 20 feet per minute film speed through the jet to produce a highly dispersed fractured film which is wounded up with little or no twist. Such a product would have an average denier per fractured ribbon in the order of about 5 to 6.

The fractured ribbons being rectangular in cross section have a very large surface area as compared to a round filament of the same size in denier. Since in many filtration applications a large surface area is conducive to good filtration it will be apparent that the flat fractured ribbon of the present invention has many uses for filtration fabrics or packs.

Several ends of flat fractured ribbon produced as described herein were combined together and processed into a cigarette filter rod. It was found that good removal rates are obtained due to the large surface area of the flat fractured ribbons. In examining the fractured ribbons under a microscope it is noted that a number of very small hairlike short fine extensions protrude from the large coarse ribbons. These short fine extensions have a width of about 2 to 5 microns and appear as tiny hairs protruding from the large coarse ribbons of 12 to 90 micron width as shown in FIG. 6. It is thought that these tiny protrusions jet may be used to fracture oriented films of five or more inches in width. When films of this width are fractured in this jet, they may be collected for use in cigarette filters, twisted into a heavy rope or yarn.

Alternatively they may be left in a continuous flat web-like form and one or more layers superimposed upon each other to form a non woven batting (e.g., as shown in Examples VI–IX) which has considerable coherency due to the interconnection between the ribbons in the fractured film. If desired, these superimposed layers of flat ribbons may be bonded with heat to increase their strength. The bonding may be done in spots, by heated calender or as in Examples VI–IX above. The flat fractured web may be used to form battings or a reinforcing component of battings in which conventional staple textile fibers are used, in which case the polypropylene web may act as the binder fiber when the batting mixture is subjected to heat.

Other types of jets which are useful for disintegrating film as described are shown in companion application Ser. No. 223,587 of Dyer and Gallagher now abandoned, this type jet also being useful for disintegrating wide sheets of film. For narrow strips of film, jets such as disclosed in companion application of Fletcher and Dyer, Ser. No. 183,448 now Patent No. 3,220,082 may be used. These jets are useful for increasing the amount of interfilament entanglement between the flat filaments in a film yarn of the present invention.

If desired, large circular jets such as described by co-inventor Dyer and others in companion application Ser. No. 27,091, now U.S. Patent 3,099,594, may be used for disintegrating the film. In this case, due to the larger size of the jet a wide film may be fed to the jet by partially crumpling it together into a rod-like shape as it enters the jet.

The foregoing serves to illustrate the concept that a wide number of types of jets can be used successfully in the disintegration of film depending on the particular end effects and sizes of product and forms of product to be made.

In some cases it may be desired to produce a yarn composed of a mixture of flat fractured ribbons and existing continuous filament or staple fiber made from such materials as acetate, polyester, acrylics, modacrylics, or nylon or elastomer yarns. In these cases the continuous filament yarn may be introduced into the jet along with the oriented film strip or ribbon so that in the jet as the film is fractured the filaments of the continuous filament yarn are dispersed at random amongst the flat fractured ribbons to produce a composite yarn. If desired, either the film or the continuous filament yarn may be fed at a greater rate to cause the slower fed material to become the core of the yarn and the overfed material to become the surface fiber.

For example, if it is desired to have a very strong core but retain the appearance and hand of acetate yarn, the acetate yarn would be overfed at a rate of twice that of the rate of feed of the film. Combining an elastic yarn or Spandex yarn with equal feed or underfeed with the oriented film in the disintegrating jet will produce a wide variety of elastic yarns having an elastic core and a flat fractured ribbon sheath. It will also be apparent from the foregoing that two strips of oriented film may be fed at different speeds. The film being fed at the higher rate will form a bulky, loopy surface around the film which is fed at the slower rate to form a core. The resultant yarn is extremely bulky and has uses in many areas where bulk and cover are desired in a yarn. One of the past disadvantages of polypropylene ropes is their low resistance to degradation by the heat generated when a polypropylene rope is snubbed around a capstan. By overfeeding a heat-resistant fiber such as polyester yarn to the jet along with the polypropylene film which is fed at a lower speed, a sheath of heat-resistant fibers will be formed around the high-strength polypropylene flat, fractured-ribbon core. The resultant rope thus will have good resistance to the heat and abrasion generated due to friction but still have the high strength of the polypropylene.

While in the foregoing discussion the process has been described principally in relation to polypropylene film, a number of other materials may also be used in the process.

*Example XIII*

A 1″-wide by 3-mil thick polyallomer film was drafted 5.8:1 in 350° F. air, heat set at 300° F. in air and passed through the air jet feed of FIG. 4 with 60 pounds per square inch air. A flat, fractured-ribbon yarn was produced.

*Example XIV*

A polyester film 1¼″ wide by 1-mil thick was drafted in hot air at 250° F., at a draft ratio of 5.1 to 1, and heat set at 450° in air. The drafted polyester film was then fed through an air jet using 60 pounds air pressure. The resultant product was a staple-like, fractured-film material. It was observed that under equal conditions, the polyester film produced a more staple-like material than is obtained with polypropylene film. That is, there were fewer interconnections between the fine fractured ribbons in a polyester material than in a fractured polypropylene material.

From the foregoing two examples, it will be apparent that any of these materials could be blended with polypropylene or with each other by feeding the two different films through the jet in the desired proportions. The flat fractured ribbons described herein may be textured, if desired, by several of the known means of texturing conventional continuous filament or staple fiber yarns. For example, if desired, prior to twisting the fractured film may be subjected to a stuffer-box crimping texturing method and then formed into yarn or cut into short lengths for use as staple fiber. If desired, prior to twisting, the flat, fractured-film product may be subjected to a texturing process wherein the texturing is done by a swirling air current or by passing it through any of the known mechanical false-twist texturing processes.

*Example XV*

The one thousand (1000)-denier end of the flat fractured ribbon described in Example I was processed through the baffle texturing jet as described in companion U.S. patent application Ser. No. 219,610 of co-inventor Dyer et al. An attractive curly yarn was produced by this process.

From the foregoing description and examples, it will be apparent that the flat fractured ribbons of this process may be treated and handled or used by any of those techniques which are known in the textile trade for converting yarns or fibers into end products. Flat, fractured-ribbon yarn has the unique property of resulting in a higher gram per denier tenacity than can be obtained with staple-fiber yarns produced from the same material.

The highest degree of orientation preferred above is in direct relation to the orientation temperature, the oven hold-up time, and the width and thickness of the unoriented film. Assuming a constant film width of 1 inch and a variation in film thickness from ½ to 5 mils, the maximum draft ratio is seen to vary from about 3:1 for the ½ mil to about 15:1 for the 5 mil using an optimum combination of hold-up time and temperature. However, the ratios reached with hot air ovens do not necessarily represent the absolute maximum attainable, since some increase may be effected with another type of orientation heat such as steam. The range from 3:1 to 15:1 is considered to contain the preferred drafting ratios for polypropylene film as used above.

When less than the maximum drafting ratio is used, all other conditions remaining constant, it becomes apparent that the degree of fracture and separation effected in the fluid jet is reduced, and the resulting fractured ribbons are thicker and wider.

The take-up rate or production speed is not seen limited to any particular value. The hold-up time is directly proportional to the take-up rate; but for any given rate, the length and temperature of the oven can be designed to produce the necessary film temperature. In the various examples, take-up rates ranging from 300 ft./min. to 600 ft./min. were successfully used without indication of reaching a limit in either direction. The upper limits in production would be determined by the maximum speed at which the equipment operators could handle the materials in hook-up and doffing operations.

The air or steam pressures used in the fluid jet are in many instances also in direct relation to the thickness of the film. An unoriented 5-mil film may be drafted and processed into flat fractured ribbons with a 90 p.s.i. jet pressure, but the jet pressure used in this instance will be higher than for a 1-mil film, assuming the same degree of fracture is effected in both thicknesses. The pressure ranges used in various runs have varied from 5 to 90 p.s.i. with maximum unoriented film thicknesses of 5 mils. It is possible that higher jet pressures would be desirable for even thicker films (6–10 mils) to produce the desired amounts of fracture.

From the preceding description it may be seen that according to our invention we produce efficient nonwoven products as well as yarn products such as baler twine. Thus, our fractured film may be compacted into filters of good tar removal characteristics and also carded or otherwise converted into well bonded nonwoven batts of good strength and high resilience.

Although the invention has been described in considerable detail with particular reference to certain preferred embodiments thereof, variations and modifications can be effected within the spirt and scope of the invention

We claim:
1. A process for the production of a fibrous filter product comprising the steps of:
   (a) orienting by drafting a polymeric film to increase its fracturability factor to greater than about 300;
   (b) fracturing said drafted, polymeric film to longitudinally slit said film into a plurality of discontinuous ribbons defined by said slits, each having a denier of about 5 to about 20 and each of said ribbons having less than about 10% by weight of ribbon of hair-like, short extensions of less than about 5 microns in size extending outwardly therefrom, said fracturing and hairlike extensions being produced by subjecting said film to a jet of high pressure fluid impinging on the surfaces thereof;
   (c) compacting a plurality of said ribbons into a fibrous, porous mass the pores of which are caused to be tortuous passageways by said hair-like extensions and the ribbons themselves.

2. A process according to claim 1 wherein said ribbons are combined with a plurality of fibers of cellulose acetate before being compacted into a fibrous mass.

3. A process according to claim 1 wherein said ribbons are crimped before being compacted into said fibrous mass.

4. The process according to claim 3 wherein about 10% by weight of a low melting point polyethylene binder powder is dusted onto said crimped ribbons which are then subjected to heat sufficient to actuate said binder as said ribbons are compacted into a fibrous mass.

5. A process according to claim 4 wherein said compacted mass is in the form of a cigarette filter.

References Cited

UNITED STATES PATENTS

| | | | |
|---|---|---|---|
| 2,869,967 | 1/1959 | Breen | 57—140 |
| 2,931,364 | 4/1960 | Mueller | 131—208 |
| 2,966,157 | 12/1960 | Tovey et al. | 131—208 |
| 3,039,908 | 6/1962 | Parmele | 156—200 |
| 3,144,025 | 8/1964 | Erlich | 131—208 |
| 3,177,557 | 4/1965 | White | 28—72 |

FOREIGN PATENTS 864,695    4/1961    Great Britain.

EARL M. BERGERT, *Primary Examiner.*

MELVIN D. REIN, *Examiner.*

P. DIER, *Assistant Examiner.*